United States Patent
Mayo et al.

(10) Patent No.: US 9,190,876 B2
(45) Date of Patent: Nov. 17, 2015

(54) SYSTEMS AND METHODS FOR DETECTING WIRELESS CHARGING TRANSMIT CHARACTERISTICS

(71) Applicant: QUALCOMM Incorporated, San Diego, CA (US)

(72) Inventors: Gabriel Isaac Mayo, Potomac, MD (US); Ryan Tseng, Coronado, CA (US); Edward Kenneth Kallal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 478 days.

(21) Appl. No.: 13/801,981

(22) Filed: Mar. 13, 2013

(65) Prior Publication Data

US 2014/0091634 A1    Apr. 3, 2014

Related U.S. Application Data

(60) Provisional application No. 61/707,743, filed on Sep. 28, 2012.

(51) Int. Cl.
*H01F 27/42* (2006.01)
*H01F 37/00* (2006.01)
(Continued)

(52) U.S. Cl.
CPC .............. *H02J 17/00* (2013.01); *H04B 5/0037* (2013.01); *H04B 5/0075* (2013.01)

(58) Field of Classification Search
CPC ......... H02J 5/005; H02J 7/025; H04B 5/0037
USPC ....................................................... 307/104
See application file for complete search history.

(56) References Cited

U.S. PATENT DOCUMENTS 8,129,865 B2    3/2012   Krumme et al.
8,233,871 B2    7/2012   Keehr et al.
(Continued)

FOREIGN PATENT DOCUMENTS

WO    WO-2009081115 A1    7/2009
WO       2010118075 A2   10/2010
(Continued)

OTHER PUBLICATIONS

International Search Report and Written Opinion—PCT/US2013/060676—ISA/EPO—Feb. 25, 2014.
(Continued)

*Primary Examiner* — Dharti Patel
(74) *Attorney, Agent, or Firm* — Knobbe, Martens, Olson & Bear, LLP

(57) ABSTRACT

This disclosure provides systems, methods and apparatus for detecting wireless charging transmit characteristics. One aspect of the disclosure provides a method of detecting a transmit characteristic in a wireless power transmission device. The device includes a series element electrically coupled to a transmit coil. The method includes determining real and imaginary components of a first voltage at a first terminal of the series element. The method further includes determining real and imaginary components of a second voltage at a second terminal of the series element. The method further includes determining real and imaginary components of a current through the series element, based on the determined first and second voltages. The method further includes determining transmit characteristics such as nodal voltages, currents, power and impedances based on determined voltages and currents. The method further includes adjusting a characteristic of a wireless power transmission based on the determined transmit characteristics.

42 Claims, 7 Drawing Sheets

(51) Int. Cl.
*H02J 17/00* (2006.01)
*H04B 5/00* (2006.01)

(56) References Cited

U.S. PATENT DOCUMENTS

| | | | |
|---|---|---|---|
| 9,071,284 B2 * | 6/2015 | Wheeland et al. | |
| 2007/0035356 A1 | 2/2007 | Ranta | |
| 2010/0271012 A1 * | 10/2010 | Patterson et al. | 324/207.15 |
| 2011/0227571 A1 * | 9/2011 | Sekiguchi et al. | 324/307 |
| 2012/0091799 A1 | 4/2012 | Rofougaran et al. | |
| 2012/0161539 A1 | 6/2012 | Kim et al. | |
| 2012/0242160 A1 | 9/2012 | Tseng | |
| 2014/0159503 A1 * | 6/2014 | Murakami et al. | 307/104 |

FOREIGN PATENT DOCUMENTS

| | | |
|---|---|---|
| WO | WO-2012112703 A1 | 8/2012 |
| WO | WO-2013088238 A2 | 6/2013 |

OTHER PUBLICATIONS

Partial International Search Report—PCT/US2013/060676—ISA/EPO—Nov. 29, 2013.

Kuyvenhoven, N., et al., "Development of a Foreign Object Detection and Analysis Method for Wireless Power Systems," 2011 IEEE Symposium on Product Compliance Engineering (PSES), pp. 1-6.

* cited by examiner

SYSTEMS AND METHODS FOR DETECTING WIRELESS CHARGING TRANSMIT CHARACTERISTICS

CROSS-REFERENCE TO RELATED APPLICATIONS

This application claims the benefit of U.S. Provisional Patent application Ser. No. 61/707,743 entitled "Systems and Methods for Detecting Wireless Charging Transmit Characteristics" which was filed Sep. 28, 2012. The entirety of the aforementioned application is herein incorporated by reference.

FIELD

The present disclosure relates generally to wireless power. More specifically, the disclosure is directed to detecting transmit characteristics in wireless power systems.

BACKGROUND

An increasing number and variety of electronic devices are powered via rechargeable batteries. Such devices include mobile phones, portable music players, laptop computers, tablet computers, computer peripheral devices, communication a devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors can sometimes be inconvenient or cumbersome and have other drawbacks. Wireless charging systems that are capable of transferring power in free space to be used to charge rechargeable electronic devices or provide power to electronic devices can overcome some of the deficiencies of wired charging solutions. As such, wireless power transfer systems and methods that efficiently and safely transfer power to electronic devices are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

One aspect of the disclosure provides a method of detecting a transmit characteristic in a wireless power transmission device. The device includes a series element electrically coupled to a transmit coil. The method includes determining real and imaginary components of a first voltage at a first terminal of the series element. The method further includes determining real and imaginary components of a second voltage at a second terminal of the series element. The method further includes determining real and imaginary components of a current through the series element, based on the determined first and second voltages. The method further includes determining a transmit characteristic based on the determined voltages and determined current. The method further includes adjusting a characteristic of a wireless power transmission based on the determined transmit characteristic.

Another innovative aspect of the present disclosure includes a wireless device. The device includes a transmit coil configured to transmit wireless power to a receiver. The device further includes a quadrature clock generator configured to generate in-phase (I) and quadrature (Q) clock signals. The device further includes a series element electrically coupled to the transmit coil. The device further includes a first mixer configured to multiply at least one signal at a first terminal of the series element by one of the I and Q signals. The device further includes a second mixer configured to multiply at least one signal at to a second terminal of the series element by one of the I and Q signals.

Another innovative aspect of the present disclosure includes an apparatus for detecting a transmit characteristic in a wireless power transmission device. The device includes a series element electrically coupled to a transmit coil. The apparatus includes means for determining real and imaginary components of a first voltage at a first terminal of the series element. The apparatus further includes means for determining real and imaginary components of a second voltage at a second terminal of the series element. The apparatus further includes means for determining real and imaginary components of a current through the series element, based on the determined first and second voltages. The apparatus further includes means for determining a transmit characteristic based on the determined voltages and determined current. The apparatus further includes means for adjusting a characteristic of a wireless power transmission based on the determined transmit characteristic.

Another innovative aspect of the present disclosure includes a non-transitory computer-readable medium including code that, when executed, causes an apparatus to determine real and imaginary components of a first voltage at a first terminal of a series element. The series element is electrically coupled to a transmit coil. The medium further includes code that, when executed, causes the apparatus to determine real and imaginary components of a second voltage at a second terminal of the series element. The medium further includes code that, when executed, causes the apparatus to determine real and imaginary components of a current through the series element, based on the determined first and second voltages. The medium further includes code that, when executed, causes the apparatus to determine a transmit characteristic based on the determined voltages and determined current. The medium further includes code that, when executed, causes the apparatus to adjust a characteristic of a wireless power transmission based on the determined transmit characteristic.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

Figure 1:
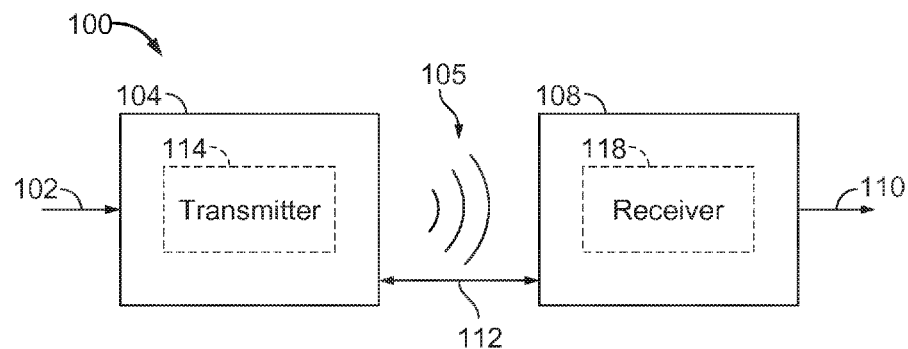
FIG. 1 is a functional block diagram of an exemplary wireless power transfer system, in accordance with exemplary embodiments of the invention.

The various features illustrated in the drawings may not be drawn to scale. Accordingly, the dimensions of the various features can be arbitrarily expanded or reduced for clarity. In addition, some of the drawings may not depict all of the components of a given system, method or device. Finally, like reference numerals can be used to denote like features throughout the specification and figures.

DETAILED DESCRIPTION

The detailed description set forth below in connection with the appended drawings is intended as a description of exemplary embodiments of the invention and is not intended to represent the only embodiments in which the invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power can refer to transferring any form of energy associated with electric fields, magnetic fields, electromagnetic fields, or otherwise from a transmitter to a receiver without the use of physical electrical conductors (e.g., power can be transferred through free space). The power output into a wireless field (e.g., a magnetic field) can be received, captured by, or coupled by a "receiving coil" to achieve power transfer.

FIG. 1 is a functional block diagram of an exemplary wireless power transfer system 100, in accordance with exemplary embodiments of the invention. Input power 102 can be provided to a transmitter 104 from a power source (not shown) for generating a field 105 for providing energy transfer. A receiver 108 can couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer can be provided over larger distance in contrast to purely inductive solutions that can require large coils that require coils to be very close (e.g., mms). Resonant inductive coupling techniques can thus allow for improved efficiency and power transfer over various distances and with a variety of inductive coil configurations.

The receiver 108 can receive power when the receiver 108 is located in an energy field 105 produced by the transmitter 104. The field 105 corresponds to a region where energy output by the transmitter 104 can be captured by a receiver 105. In some cases, the field 105 can correspond to the "near-field" of the transmitter 104 as will be further described below. The transmitter 104 can include a transmit coil 114 for outputting an energy transmission. The receiver 108 further includes a receive coil 118 for receiving or capturing energy from the energy transmission. The near-field can correspond to a region in which there are strong reactive fields resulting from the currents and charges in the transmit coil 114 that minimally radiate power away from the transmit coil 114. In some cases the near-field can correspond to a region that is within about one wavelength (or a fraction thereof) of the transmit coil 114. The transmit and receive coils 114 and 118 are sized according to applications and devices to be associated therewith. As described above, efficient energy transfer can occur by coupling a large portion of the energy in a field 105 of the transmit coil 114 to a receive coil 118 rather than propagating most of the energy in an electromagnetic wave to the far field. When positioned within the field 105, a "coupling mode" can be developed between the transmit coil 114 and the receive coil 118. The area around the transmit and receive coils 114 and 118 where this coupling can occur is referred to herein as a coupling-mode region.

Figure 2:
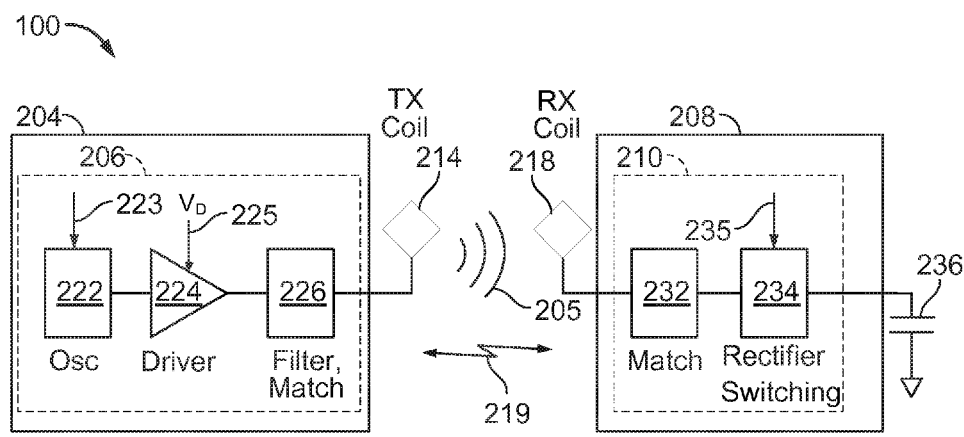
FIG. 2 is a functional block diagram of exemplary components that can be used in the wireless power transfer system of FIG. 1, in accordance with various exemplary embodiments of the invention.

FIG. 2 is a functional block diagram of exemplary components that can be used in the wireless power transfer system 100 of FIG. 1, in accordance with various exemplary embodiments of the invention. The transmitter 204 can include transmit circuitry 206 that can include an oscillator 222, a driver circuit 224, and a filter and matching circuit 226. The oscillator 222 can be configured to generate a signal at a desired frequency, such as 468.75 KHz, 6.78 MHz, or 13.56 MHz, that can be adjusted in response to a frequency control signal 223. The oscillator signal can be provided to a driver circuit 224 configured to drive the transmit coil 214 at, for example, a resonant frequency of the transmit coil 214. The driver circuit 224 can be a switching amplifier configured to receive a square wave from the oscillator 222 and output a sine wave. For example, the driver circuit 224 can be a class E amplifier. A filter and matching circuit 226 can be also included to filter out harmonics or other unwanted frequencies and match the impedance of the transmitter 204 to the transmit coil 214.

The receiver 208 can include receive circuitry 210 that can include a matching circuit 232 and a rectifier and switching circuit 234 to generate a DC power output from an AC power input to charge a battery 236 as shown in FIG. 2 or to power a device (not shown) coupled to the receiver 108. The matching circuit 232 can be included to match the impedance of the receive circuitry 210 to the receive coil 218. The receiver 208 and transmitter 204 can additionally communicate on a separate communication channel 219 (e.g., Bluetooth, zigbee, cellular, etc). The receiver 208 and transmitter 204 can alternatively communicate via in-band signaling using characteristics of the wireless field 206.

As described more fully below, receiver 208, that can initially have a selectively disableable associated load (e.g., battery 236), can be configured to determine whether an amount of power transmitted by transmitter 204 and receiver by receiver 208 is appropriate for charging a battery 236. Further, receiver 208 can be configured to enable a load (e.g., battery 236) upon determining that the amount of power is appropriate. In some embodiments, a receiver 208 can be configured to directly utilize power received from a wireless power transfer field without charging of a battery 236. For example, a communication a device, such as a near-field communication (NFC) or radio-frequency identification a device (RFID can be configured to receive power from a wireless power transfer field and communicate by interacting with the wireless power transfer field and/or utilize the received power to communicate with a transmitter 204 or other devices.

Figure 3:
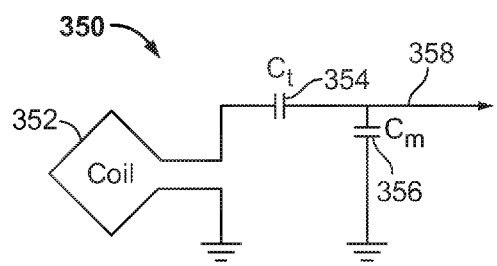
FIG. 3 is a schematic diagram of a portion of transmit circuitry or receive circuitry of FIG. 2 including a transmit or receive coil, in accordance with exemplary embodiments of the invention.

FIG. 3 is a schematic diagram of a portion of transmit circuitry 206 or receive circuitry 210 of FIG. 2 including a transmit or receive coil 352, in accordance with exemplary embodiments of the invention. As illustrated in FIG. 3, transmit or receive circuitry 350 used in exemplary embodiments can include a coil 352. The coil can also be referred to or be configured as a "loop" antenna 352. The coil 352 can also be referred to herein or be configured as a "magnetic" antenna or an induction coil. The term "coil" is intended to refer to a component that can wirelessly output or receive energy for coupling to another "coil." The coil can also be referred to as an "antenna" of a type that is configured to wirelessly output or receive power. The coil 352 can be configured to include an air core or a physical core such as a ferrite core (not shown). Air core loop coils can be more tolerable to extraneous physical devices placed in the vicinity of the core. Furthermore, an air core loop coil 352 allows the placement of other components within the core area. In addition, an air core loop can more readily enable placement of the receive coil 218 (FIG. 2) within a plane of the transmit coil 214 (FIG. 2) where the coupled-mode region of the transmit coil 214 (FIG. 2) can be more powerful.

As stated, efficient transfer of energy between the transmitter 104 and receiver 108 can occur during matched or nearly matched resonance between the transmitter 104 and the receiver 108. However, even when resonance between the transmitter 104 and receiver 108 are not matched, energy can be transferred, although the efficiency can be affected. Transfer of energy occurs by coupling energy from the field 105 of the transmitting coil to the receiving coil residing in the neighborhood where this field 105 is established rather than propagating the energy from the transmitting coil into free space.

The resonant frequency of the loop or magnetic coils is based on the inductance and capacitance. Inductance can be simply the inductance created by the coil 352, whereas, capacitance can be added to the coil's inductance to create a resonant structure at a desired resonant frequency. As a non-limiting example, capacitor 352 and capacitor 354 can be added to the transmit or receive circuitry 350 to create a resonant circuit that selects a signal 356 at a resonant frequency. Accordingly, for larger diameter coils, the size of capacitance needed to sustain resonance can decrease as the diameter or inductance of the loop increases. Furthermore, as the diameter of the coil increases, the efficient energy transfer area of the near-field can increase. Other resonant circuits formed using other components are also possible. As another non-limiting example, a capacitor can be placed in parallel between the two terminals of the coil 350. For transmit coils, a signal 358 with a frequency that substantially corresponds to the resonant frequency of the coil 352 can be an input to the coil 352.

In one embodiment, the transmitter 104 can be configured to output a time varying magnetic field with a frequency corresponding to the resonant frequency of the transmit coil 114. When the receiver is within the field 105, the time varying magnetic field can induce a current in the receive coil 118. As described above, if the receive coil 118 is configured to be resonant at the frequency of the transmit coil 114, energy can be efficiently transferred. The AC signal induced in the receive coil 118 can be rectified as described above to produce a DC signal that can be provided to charge or to power a load.

Figure 4:
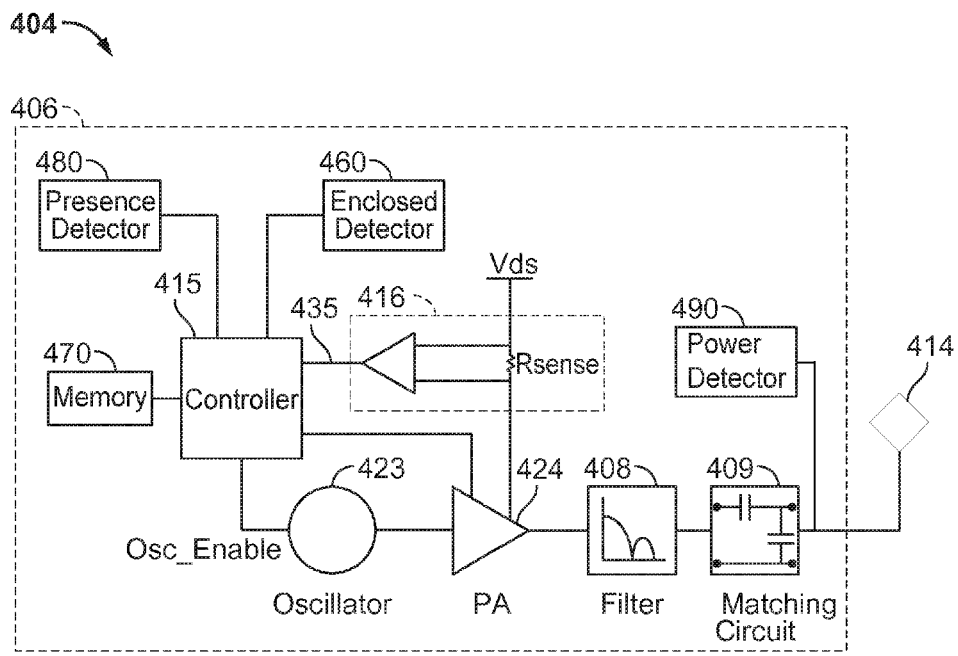
FIG. 4 is a functional block diagram of a transmitter that can be used in the wireless power transfer system of FIG. 1, in accordance with exemplary embodiments of the invention.

FIG. 4 is a functional block diagram of a transmitter 404 that can be used in the wireless power transfer system of FIG. 1, in accordance with exemplary embodiments of the invention. The transmitter 404 can include transmit circuitry 406 and a transmit coil 414. The transmit coil 414 can be the coil 352 as shown in FIG. 3. The transmit circuitry 406 can provide RF power to the transmit coil 414 by providing an oscillating signal resulting in generation of energy (e.g., magnetic flux) about the transmit coil 414. The transmitter 404 can operate at any suitable frequency. By way of example, the transmitter 404 can operate at the 13.56 MHz ISM band.

The transmit circuitry 406 can include a fixed impedance matching circuit 409 for matching the impedance of the transmit circuitry 406 (e.g., 50 ohms) to the transmit coil 414 and a low pass filter (LPF) 408 configured to reduce harmonic emissions to levels to prevent self-jamming of devices coupled to receivers 108 (FIG. 1). Other exemplary embodiments can include different filter topologies, including but not limited to, notch filters that attenuate specific frequencies while passing others and can include an adaptive impedance match, that can be varied based on measurable transmit metrics, such as output power to the coil 414 or DC current drawn by the driver circuit 424. Transmit circuitry 406 further includes a driver circuit 424 configured to drive an RF signal as determined by an oscillator 423. The transmit circuitry 406 can be comprised of discrete devices or circuits, or alternately, can be comprised of an integrated assembly. An exemplary RF power output from transmit coil 414 can be around 1 Watt-10 Watts, such as around 2.5 Watts.

The transmit circuitry 406 can further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 can also be referred to herein as processor 415. Adjustment of oscillator phase and related circuitry in the transmission path can allow for reduction of out of band emissions, especially when transitioning from one frequency to another.

The transmit circuitry 406 can further include a load sensing circuit 416 for detecting the presence or absence of active receivers in the vicinity of the near-field generated by transmit coil 414. By way of example, a load sensing circuit 416 monitors the current flowing to the driver circuit 424, that can be affected by the presence or absence of active receivers in the vicinity of the field generated by transmit coil 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 can be used to determine whether an invalid device is positioned within a wireless power transfer region of the transmitter 404.

The transmit coil 414 can be implemented with a Litz wire or as an antenna strip with the thickness, width and metal type selected to keep resistive losses low. In a one implementation, the transmit coil 414 can generally be configured for association with a larger structure such as a table, mat, lamp or other less portable configuration. Accordingly, the transmit coil 414 generally may not need "turns" in order to be of a practical dimension. An exemplary implementation of a transmit coil 414 can be "electrically small" (i.e., fraction of the wavelength) and tuned to resonate at lower usable frequencies by using capacitors to define the resonant frequency.

The transmitter 404 can gather and track information about the whereabouts and status of receiver devices that can be associated with the transmitter 404. Thus, the transmit circuitry 406 can include a presence detector 480, an enclosed detector 460, or a combination thereof, connected to the controller 415 (also referred to as a processor herein). The controller 415 can adjust an amount of power delivered by the driver circuit 424 in response to presence signals from the presence detector 480 and the enclosed detector 460. The transmitter 404 can receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 can be a motion detector utilized to sense the initial presence of a device to be charged that is inserted into the coverage area of the transmitter 404. After detection, the transmitter 404 can be turned on and the RF power received by the device can be used to toggle a switch on the Rx device in a pre-determined manner, which in turn results in changes to the driving point impedance of the transmitter 404.

As another non-limiting example, the presence detector 480 can be a detector capable of detecting a human, for example, by infrared detection, motion detection, or other suitable means. In some exemplary embodiments, there can be regulations limiting the amount of power that a transmit coil 414 can transmit at a specific frequency. In some cases, these regulations are meant to protect humans from electromagnetic radiation. However, there can be environments where a transmit coil 414 is placed in areas not occupied by humans, or occupied infrequently by humans, such as, for example, garages, factory floors, shops, and the like. If these environments are free from humans, it can be permissible to increase the power output of the transmit coil 414 above the normal power restrictions regulations. In other words, the controller 415 can adjust the power output of the transmit coil 414 to a regulatory level or lower in response to human presence and adjust the power output of the transmit coil 414 to a level above the regulatory level when a human is outside a regulatory distance from the electromagnetic field of the transmit coil 414.

As a non-limiting example, the enclosed detector 460 (can also be referred to herein as an enclosed compartment detector or an enclosed space detector) can be a device such as a sense switch for determining when an enclosure is in a closed or open state. When a transmitter is in an enclosure that is in an enclosed state, a power level of the transmitter can be increased.

In exemplary embodiments, a method by which the transmitter 404 does not remain on indefinitely can be used. In this case, the transmitter 404 can be programmed to shut off after a user-determined amount of time. This feature prevents the transmitter 404, notably the driver circuit 424, from running long after the wireless devices in its perimeter are fully charged. This event can be due to the failure of the circuit to detect the signal sent from either the repeater or the receive coil that a device is fully charged. To prevent the transmitter 404 from automatically shutting down if another device is placed in its perimeter, the transmitter 404 automatic shut off feature can be activated only after a set period of lack of motion detected in its perimeter. The user can be able to determine the inactivity time interval, and change it as desired. As a non-limiting example, the time interval can be longer than that needed to fully charge a specific type of wireless device under the assumption of the device being initially fully discharged.

As discussed above, the load sensing circuit 416 can monitor the current flowing to the driver circuit 424. In an embodiment, the detected current at the driver circuit 424 can be used to account for power lost to unintentional loads. Unintentional loads can include, for example, conductive loops or surfaces that could heat up or degrade the operation of the system. In an embodiment, the controller 415 can compare the DC power consumed by the driver circuit 424 to a load power reported by registered loads such as, for example, the receiver 208 (FIG. 2). In some embodiments, however, DC to RF conversion efficiency can vary depending on load conditions. Accordingly, the current measured at the driver circuit 424 may not accurately reflect transmitted power. In some embodiments, the transmit circuitry 406 can include a directional coupler configured to measure forward and reflected power. In some embodiments, however, the directional coupler could reduce efficiency of the transmit circuitry and/or introduce high implementation cost.

In an embodiment, the transmit circuitry 406 can include a power detector 490 coupled to the transmit coil 414. The power detector 490 can be configured to measure one or more characteristics indicative of transmit power. In an embodiment, the power detector 490 can be capacitively coupled to the transmit coil 414. For example, the power detector 490 can be configured to measure differential voltages via a capacitive voltage divider. In an embodiment, the power detector 490 can implement a resistive voltage divider. The power detector 490 can be measure voltage and/or current between the matching circuit 409 and the transmit coil 414. The power detector 490 can measure the voltage and/or current vectorially and/or differentially. The controller 415 can receive the measured transmit power from the power detector 490, and can compare the measured transmit power to a received transmit power reported by a receiver such as the receiver 208 (FIG. 2).

Figure 5:
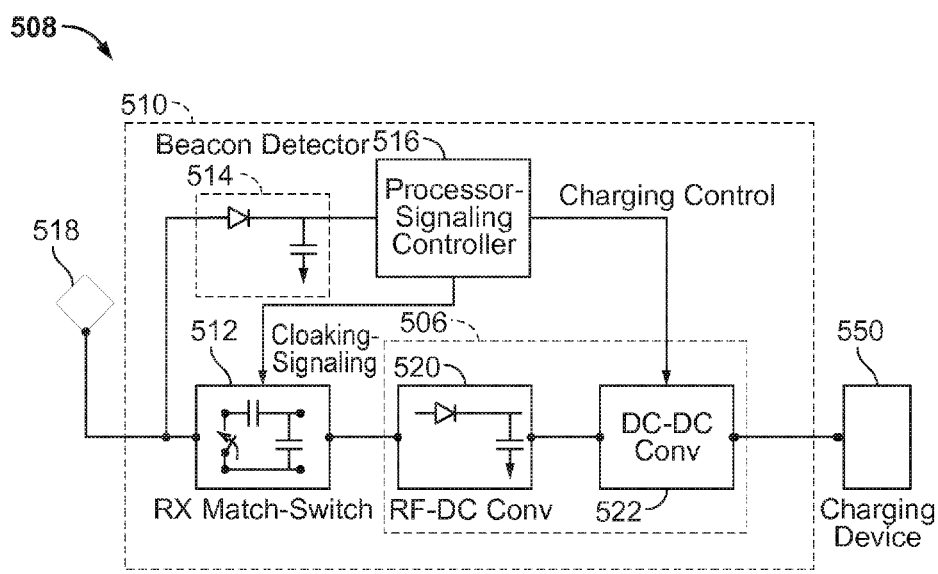
FIG. 5 is a functional block diagram of a receiver that can be used in the wireless power transfer system of FIG. 1, in accordance with exemplary embodiments of the invention.

FIG. 5 is a functional block diagram of a receiver 508 that can be used in the wireless power transfer system of FIG. 1, in accordance with exemplary embodiments of the invention. The receiver 508 includes receive circuitry 510 that can include a receive coil 518. Receiver 508 further couples to device 550 for providing received power thereto. It should be noted that receiver 508 is illustrated as being external to device 550 but can be integrated into device 550. Energy can be propagated wirelessly to receive coil 518 and then coupled through the rest of the receive circuitry 510 to device 550. By way of example, the charging device can include devices such as mobile phones, portable music players, laptop computers, tablet computers, computer peripheral devices, communication a devices (e.g., Bluetooth devices), digital cameras, hearing aids (an other medical devices), and the like.

Receive coil 518 can be tuned to resonate at the same frequency, or within a specified range of frequencies, as transmit coil 414 (FIG. 4). Receive coil 518 can be similarly dimensioned with transmit coil 414 or can be differently sized based upon the dimensions of the associated device 550. By way of example, device 550 can be a portable electronic device having diametric or length dimension smaller than the diameter or length of transmit coil 414. In such an example, receive coil 518 can be implemented as a multi-turn coil in order to reduce the capacitance value of a tuning capacitor (not shown) and increase the receive coil's impedance. By way of example, receive coil 518 can be placed around the substantial circumference of device 550 in order to maximize the coil diameter and reduce the number of loop turns (i.e., windings) of the receive coil 518 and the inter-winding capacitance.

Receive circuitry 510 can provide an impedance match to the receive coil 518. Receive circuitry 510 includes power conversion circuitry 506 for converting a received RF energy source into charging power for use by the device 550. Power conversion circuitry 506 includes an RF-to-DC converter 520 and can also in include a DC-to-DC converter 522. RF-to-DC converter 520 rectifies the RF energy signal received at receive coil 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 can further include switching circuitry 512 for connecting receive coil 518 to the power conversion circuitry 506 or alternatively for disconnecting the power conversion circuitry 506. Disconnecting receive coil 518 from power conversion circuitry 506 not only suspends charging of device 550, but also changes the "load" as "seen" by the transmitter 404 (FIG. 2).

As disclosed above, transmitter 404 includes load sensing circuit 416 that can detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it can be desirable to time-multiplex the loading and unloading of one or more receivers to enable other receivers to more efficiently couple to the transmitter. A receiver 508 can also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 can provide a communication mechanism from receiver 508 to transmitter 404 as is explained more fully below. Additionally, a protocol can be associated with the switching that enables the sending of a message from receiver 508 to transmitter 404. By way of example, a switching speed can be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 can use on/off keying of the transmitted signal to adjust whether energy is available in the near-field. The receiver can interpret these changes in energy as a message from the transmitter 404. From the receiver side, the receiver 508 can use tuning and de-tuning of the receive coil 518 to adjust how much power is being accepted from the field. In some cases, the tuning and de-tuning can be accomplished via the switching circuitry 512. The transmitter 404 can detect this difference in power used from the field and interpret these changes as a message from the receiver 508. It is noted that other forms of modulation of the transmit power and the load behavior can be utilized.

Receive circuitry 510 can further include signaling detector and beacon circuitry 514 used to identify received energy fluctuations, that can correspond to informational signaling from the transmitter to the receiver. Furthermore, signaling and beacon circuitry 514 can also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 can also occur upon the occurrence of other events including detection of an external wired charging source (e.g., wall/USB power) providing charging power to device 550. The processor 516, in addition to controlling the cloaking of the receiver, can also monitor beacon circuitry 514 to determine a beacon state and extract messages sent from the transmitter 404. Processor 516 can also adjust the DC-to-DC converter 522 for improved performance.

As discussed above, the receiver 508 can be configured to measure received power and report the received power to the transmitter 404 (FIG. 4), for example, via the separate communication channel 219 (FIG. 2). In some embodiments, the processor 516 is configured to determine the received power and transmit the determined power to the transmitter 404. In some embodiments, the charging device 550 can include a power detector, and the charging device 550 can be configured to transmit the determined power to the transmitter 404.

Figure 6:
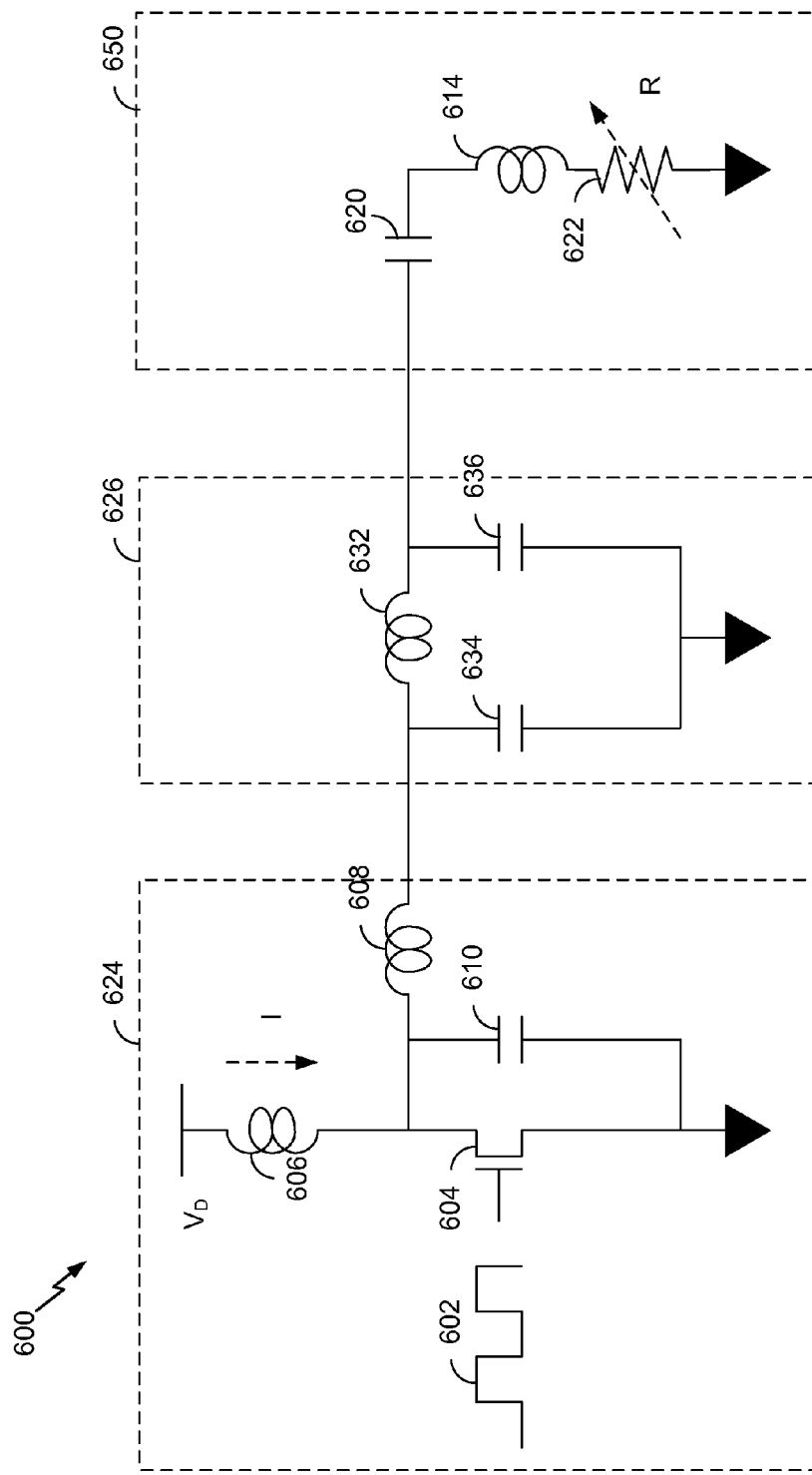
FIG. 6 is a schematic diagram of a portion of transmit circuitry that can be used in the transmit circuitry of FIG. 4.

FIG. 6 is a schematic diagram of a portion of transmit circuitry 600 that can be used in the transmit circuitry 406 of FIG. 4. The transmit circuitry 600 can include a driver circuit 624 as described above in FIG. 4. As described above, the driver circuit 624 can be a switching amplifier that can be configured to receive a square wave and output a sine wave to be provided to the transmit circuit 650. In some cases the driver circuit 624 can be referred to as an amplifier circuit. The driver circuit 624 is shown as a class E amplifier; however, any suitable driver circuit 624 can be used in accordance with embodiments of the invention. The driver circuit 624 can be driven by an input signal 602 from an oscillator 423 as shown in FIG. 4. The driver circuit 624 can also be provided with a drive voltage $V_D$ that is configured to control the maximum power that can be delivered through a transmit circuit 650. To eliminate or reduce harmonics, the transmit circuitry 600 can include a filter circuit 626. The filter circuit 626 can be a three pole (capacitor 634, inductor 632, and capacitor 636) low pass filter circuit 626.

The signal output by the filter circuit 626 can be provided to a transmit circuit 650 comprising a coil 614. The transmit circuit 650 can include a series resonant circuit having a capacitance 620 and inductance (e.g., that can be due to the inductance or capacitance of the coil or to an additional capacitor component) that can resonate at a frequency of the filtered signal provided by the driver circuit 624. The load of the transmit circuit 650 can be represented by the variable resistor 622. The load can be a function of a wireless power receiver 508 that is positioned to receive power from the transmit circuit 650.

In various embodiments, the wireless power transmission system 100, described above with respect to FIGS. 1-6, can vary a wireless power transmission based on detection of a nearby object. The nearby object can include an intended receiver, a device to be charged, and/or a foreign object. A foreign object can be something other than an intended transmission target (i.e., a non-charging device) such as, for example, a parasitic receiver, an inorganic object, or a living object (such as a human, animal, etc.). A parasitic receiver can include, for example, a non-electronic metallic object, an unauthorized chargeable device, etc.

For example, as discussed above with respect to FIG. 4, the transmitter 404 can include the presence detector 480, which can detect the presence, distance, orientation, and/or location of the nearby object. In various other embodiments, the presence detector 480 can be located in another location such as, for example, on the receiver 508, or elsewhere. The controller 415 can reduce transmission power when a foreign object is detected within a first distance. In various embodiments, the wireless power transmission system 100 can adjust a characteristic of the wireless power transmission in accordance with rules or regulations regarding biological safety, fire safety, etc. For example, the wireless power transmission system 100 can adjust the transmit power such that the electromagnetic field reaching a nearby human body is below a threshold, given the distance to the human body.

In various embodiments, the presence detector 480 can detect the presence of a nearby object based on a line-of-sight detection mechanism. Line-of-sight detection mechanisms can include for example, infrared detection, ultrasonic detection, laser detection, etc. In embodiments including embedded transmitters, where power can be transmitted through an opaque surface such as a table or desk, it can be preferable to use a non-line-of-sight detection mechanism. Non-line-of-sight mechanisms can include, for example, capacitive detection, radiometric detection, etc. In various embodiments which will be described herein, the presence detector 480 can use a harmonic detection system to detect the presence, distance, orientation, and/or location of a nearby object, based on changes in received signal strength at harmonics of the fundamental system frequency.

Referring back to FIG. 2, in certain embodiments, the wireless power transfer system 100 can include a plurality of receivers 208. In one embodiment, the size of the TX coil 214 is fixed. Accordingly, the transmitter 204 may not be well matched to different sized RX coils 218. For a variety of reasons, it can be desirable for the transmitter 204 to use a plurality of TX coils 214. In some embodiments, the plurality of TX coils 214 can be arranged in an array. In some embodiments, the array can be modular. In some embodiments, the array can include TX coils 214 of the same, or substantially the same, size.

In various embodiments, each TX coil 214 can be independently activated, based on the location of the receivers 208 and/or the size of their RX coils 218. For example, a single TX coil 214 can provide wireless power to nearby receivers 208 having relatively small RX coils 218. On the other hand, multiple TX coils 214 can be provide wireless power to nearby receivers having relatively large RX coils 218. TX coils 214 that are not near RX coils 218 can be deactivated.

In some embodiments, the plurality of TX coils 214 can form a large transmit area. The transmit area can be scalable, covering a larger area using additional TX coils 214. The TX coils 214 can allow for free positioning of devices over a large area. Moreover, they can be configured to simultaneously charge a plurality of receivers 208. In some embodiments, individual TX coils 214 can couple to each other. Accordingly, it can be desirable for the wireless power transfer system 100 to include methods, systems, and/or apparatuses for decoupling the TX coils 214.

Figure 7:
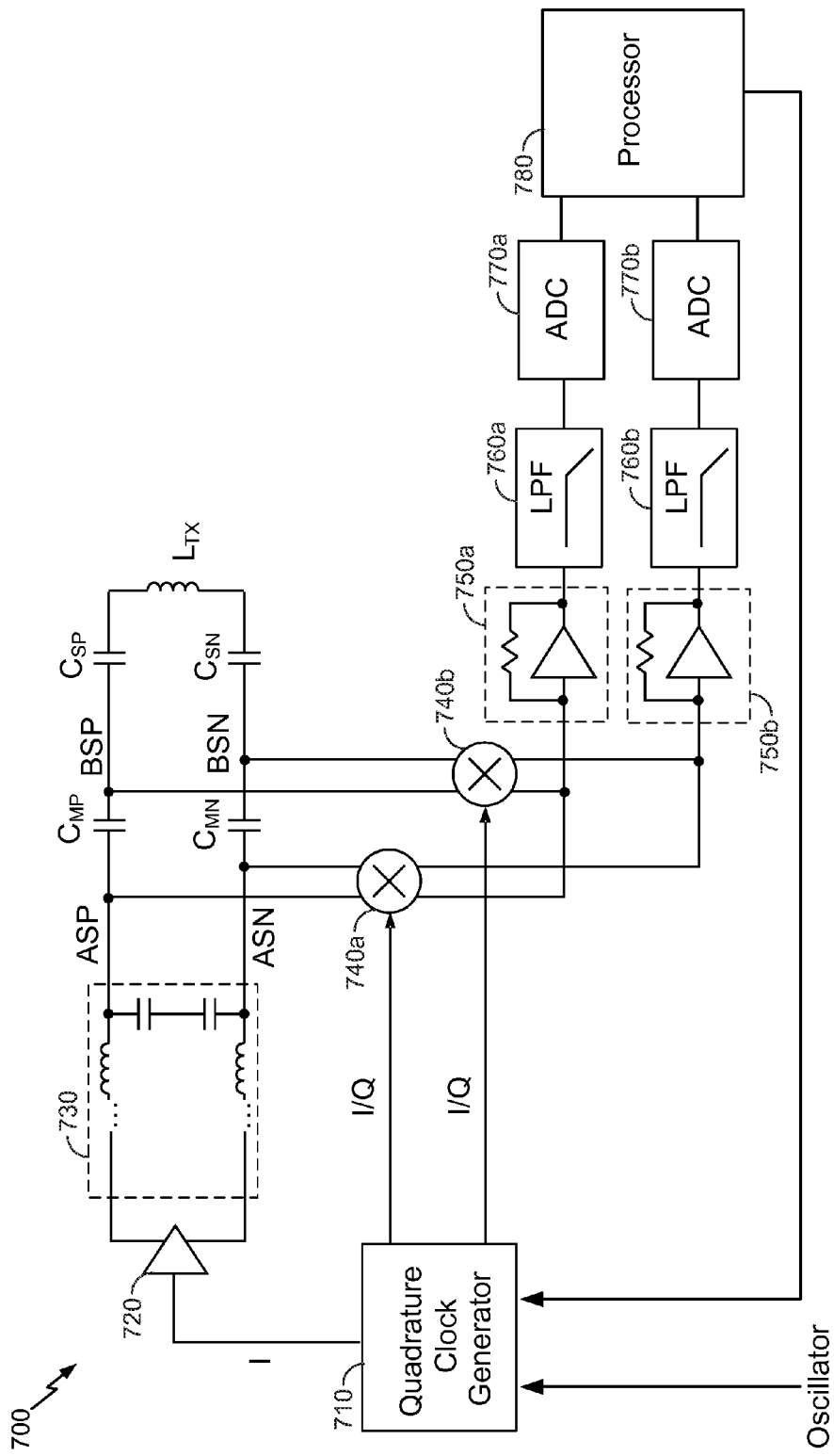
FIG. 7 is a functional block diagram of a portion of transmit circuitry that can be used in the wireless power transfer system of FIG. 1, in accordance with exemplary embodiments of the invention.

FIG. 7 is a functional block diagram of a portion of transmit circuitry 700 that can be used in the wireless power transfer system of FIG. 1, in accordance with exemplary embodiments of the invention. In various embodiments, the elements presented FIG. 7 can be configured in balanced or single ended form; FIG. 7 and further discussion presents this example in balanced form. The transmit circuitry 700 can include a quadrature clock generator 710, a transmit amplifier 720, a transmit filter and/or matching circuit 730, positive and negative measurement capacitors $C_{MP}$ and $C_{MN}$, positive and negative series capacitors $C_{SP}$ and $C_{SN}$, a transmit coil $L_{TX}$, differential mixers 740a and 740b, summing amplifiers 750a and 750b, low-pass filters (LPFs) 760a and 760b, analog-to-digital converters (ADCs) 770a and 770b, and a processor 780.

In various embodiments, the transmit circuitry 700 can be configured to determine a transmit characteristic at the transmit coil $L_{TX}$, such as a transmit power or coil impedance. For example, the transmit circuitry 700 can be configured to measure the RF voltage and/or current applied to the transmit coil $L_{TX}$. The transmit circuitry 700 can be configured to take vector measurements. For example, the transmit circuitry 700 can measure both a magnitude and a phase of the current and/or voltage applied to the transmit coil $L_{TX}$. In an embodiment, the transmit circuitry 700 can implement or include the power detector 490 (FIG. 4).

The quadrature clock generator 710 serves to provide in-phase (I) and quadrature (Q) clock signals (either positive or negative) to the transmit amplifier 720 and the mixers 740a and 740b. In the illustrated embodiment, the quadrature clock generator 710 is configured to generate the I/Q signals based on an oscillator input and control by the processor 780. In an embodiment, the oscillator input can be four times the transmit frequency. For example, in various embodiments having transmit frequencies of about 468.75 KHz, 6.78 MHz, and 13.56 MHz, the oscillator input can be about 1.87 MHZ, 27.12 MHz, and 54.24 MHz, respectively. In an embodiment, the oscillator input can be received from the oscillator 423 (FIG. 4).

The quadrature clock generator 710 can be configured to generate four clock signals I, Q, I', and Q' (generically referred to as "I/Q") at a quarter of the oscillator input frequency (e.g., 6.78 MHz). Each of the clocks I, Q, I', and Q' can represent a different phase (e.g., 0, 90, 180, and 270 degrees). Accordingly, I can be advanced 90 degrees ahead of Q. I' and Q' can be inverted versions of their respective outputs I and Q, and can provide 180 phase shifts of the main signals I and Q. A person having ordinary skill in the art will appreciate that other phase steps can be used (e.g., 45 degrees, 60 degrees, etc.).

The quadrature clock generator 710 can selectively provide both sine and cosine signals to the mixers 740a and 740b. In various embodiments, the sine and cosine signals can include sinusoidal signals (for example, in embodiments including analog multipliers) and square waves (for example, in embodiments including digital multiplexers). For example, the quadrature clock generator 710 can selectively provide one or more of the clock signals I, Q, I', and Q' to the mixers 740a and 740b via one or more multiplexers. For example, the quadrature clock generator 710 can include one multiplexer per mixer 740a and 740b. In an embodiment, the selected clock signals I/Q can be re-clocked, for example, via a D flip flop. Re-clocking the signals I/Q can reduce delay variations between phases. Selection of the clock signals I/Q provided to the mixers 740a and 740b can be controlled by, for example, the processor 780.

The transmit amplifier 720 serves to drive an RF signal to the transmit coil $L_{TX}$. The transmit amplifier 720 can drive the RF signal based on the clock signal received from the quadrature clock generator 710. In the transmit amplifier 720 receives the I clock phase from the quadrature clock generator 710. In an embodiment, the transmit amplifier 720 can receive a separate clock signal, for example, from the oscillator 423 (FIG. 4). In an embodiment, the transmit amplifier can be the driver circuit 424 (FIG. 4).

The transmit filter 730 serves to provide impedance matching and/or reduction of harmonic emissions at the transmit coil $L_{TX}$. Other exemplary embodiments can include different filter topologies, including but not limited to, notch filters that attenuate specific frequencies while passing others and can include an adaptive impedance match, that can be varied based on measurable transmit metrics, such as output power to the coil $L_{TX}$. In various embodiments, the transmit filter 730 can implement or include the filter 408 (FIG. 4) and/or the matching circuit 409 (FIG. 4).

The differential mixers 740a and 740b serve to measure voltages at the measurement capacitors $C_{MP}$ and $C_{MN}$. Particularly, the differential mixers 740a and 740b are configured to synchronously mix the I/Q clocks, received from the quadrature clock generator 710, with the RF signal to be measured using multiplying phase detectors. The measurement capacitors $C_{MP}$ and $C_{MN}$ serve as a known impedance, where the voltage across the measurement capacitors $C_{MP}$ and $C_{MN}$ is proportional to current. Additional devices can be added to scale voltage levels at the inputs of the mixers 740a and 740b. The differential mixers 740a and 740b facilitate voltage measurements on both sides of the measurement capacitors $C_{MP}$ and $C_{MN}$ (i.e., at nodes ASP, BSP, ASN, and BSN). Accordingly, the current though he measurement capacitors $C_{MP}$ and $C_{MN}$ can be calculated and used to determine the power transmitted at the transmit coil $L_{TX}$.

The summing amplifiers 750a and 750b serve to provide a virtual AC ground to the multiplexers, converting DC current to voltages which reflect the real and/or imaginary portions of $V_A+V_B$ or $V_A-V_B$, where $V_A$ represents the voltage across the nodes ASP and ASN, and $V_B$ represents the voltage across the nodes BSP and BSN. The quadrature clock generator 710 can select the particular summation performed by selecting and providing the appropriate clock phases to the mixers 740a and 740b. In some implementations, the quadrature clock generator 710 can select and provide the appropriate clock phases to the mixers 740a and 740b to individually measure $V_A$ and $V_B$.

For example, two signals driving each mixer 740a and 740b can be represented by sine waves: sinM for the differential signals measured across the node pairs ASP/ASN and BSP/BSN, and sinR or cosR for the reference signal received from the quadrature clock generator 710 (based on the in-phase and quadrature-phase signals, respectively). The mixers 740a and 740b can multiply sinM and either sinR or cosR as shown in Equations 1 and 2, where $\omega$ is $2\pi$ times the transmit frequency, and $\alpha$ is a phase offset.

$$\sin M \sin R = \frac{1}{2}[\cos(\omega t + \alpha - \omega t) - \cos(\omega t + \alpha + \omega t)] \quad (1)$$

$$\sin M \cos R = \frac{1}{2}[\sin(2\omega t + \alpha) + \sin\alpha] \quad (2)$$

The LPFs 760a and 760b serve to filter non baseband spectral content such as the $2\omega$. For example, the products sinMsinR and sinMcosR can be filtered as shown in Equations 3 and 4.

$$\text{Filtered}(\sin M \sin R) = \frac{1}{2}\cos\alpha \quad (3)$$

$$\text{Filtered}(\sin M \cos R) = \frac{1}{2}\sin\alpha \quad (4)$$

Accordingly, the angle $\alpha$ can be determined by an arctangent of the two measured signals, as shown in Equation 5.

$$\alpha = \arctan\left[\frac{1}{2}\sin\alpha \Big/ \frac{1}{2}\cos\alpha\right] \quad (5)$$

The outputs of the mixers 740a and 740b are combined at the summing amplifiers 750a and 750b, and low-pass filtered at the LPFs 760a and 760b to remove signal harmonics and provide a DC value which represents the phase offset of the signal, and a scaled portion of the magnitude. The ADCs 770a and 770b provide digital values to the processor 780. The processor 780 can determine the magnitude, for example, based on the square route of the sum of the squares of the two phase measurements.

The processor 780 is configured to adjust the quadrature clock generator 710 to source both sine and cosine signals to the mixers 740a and 740b, and to thereby obtain voltage vectors before and after the measurement capacitors $C_{MP}$ and $C_{MN}$. The processor 780 can calculate the current through the measurement capacitors $C_{MP}$ and $C_{MN}$ by dividing the voltage difference (i.e., $V_A-V_B$) by the value of the measurement capacitors $C_{MP}$ and $C_{MN}$. In various embodiments, the processor 780 can scale the measurements by one or more scaling factors and/or convert the voltage measurement to a root-mean-square (RMS) voltage. The processor 780 can further multiply the resulting complex vectors to determine real and reactive power.

In the embodiment of FIG. 7, the transmit circuitry 700 is configured to take measurements. In an embodiment, the configuration shown in FIG. 7 can allow balanced demodulation. However, one of ordinary skill in the art will appreciate that the techniques described herein can be implemented in a single-ended fashion. For example, a single measurement capacitor $C_M$ can be used.

In the embodiment of FIG. 7, the transmit circuitry 700 is configured to use measurement capacitors $C_{MP}$ and $C_{MN}$ as series impedances. However, one of ordinary skill in the art will appreciate that the techniques described herein can be applied to any impedance element, generally referred to herein as a series element $Z_M$. For example, measurement can be performed using one or more inductors in the transmit filter 730, one or more of the measurement capacitors $C_{MP}$ and $C_{MN}$ can be replaced with inductors or resistors, an active or passive reactive network, a current transformer, etc.

Similarly, one of ordinary skill in the art will appreciate that the techniques described herein can be applied to any series impedance element within the RF current path by repositioning $Z_M$. For example, measurement can be performed using one or more inductors in the transmit filter 730, one or more of the measurement capacitors $C_{SP}$ and $C_{SN}$ can be replaced with inductors or resistors, an active or passive reactive network, etc. In some embodiments, the transmit circuitry 700 can include a parallel capacitor $C_P$, in parallel with the transmit coil $L_{TX}$.

Figure 8:
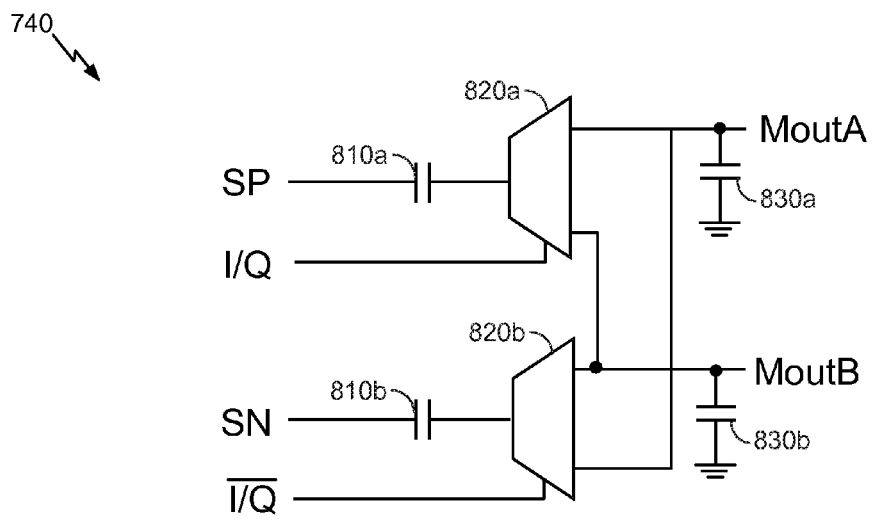
FIG. 8 is a functional block diagram of a mixer that can be used in the wireless power transfer system of FIG. 1, in accordance with exemplary embodiments of the invention.

FIG. 8 is a functional block diagram of a mixer 740 that can be used in the wireless power transfer system of FIG. 1, in accordance with exemplary embodiments of the invention.

The mixer 740 can implement or include, for example, the mixers 740a and 740b. In the illustrated embodiment, the mixer 740 receives inputs SP, SN, and I/Q, and includes two input capacitors 810a and 810b, two muxes 820a and 820b, and two output capacitors 830a and 830b.

The inputs SP and SN can be measurement signals. In various embodiments, for example, SP and SN can represent the nodes ASP and ASN, and/or BSP and BSN shown in FIG. 7. The input I/Q (and its complement) can be received from, for example, the quadrature clock generator 710 (FIG. 7).

The input capacitors 810a and 810b can each form a portion of respective high-impedance dividers configured to reduce input voltages SP and SN. In an embodiment, the input capacitor 810a can form a portion of a voltage divider configured to reduce ASP. The input capacitor 810b can form a portion of a voltage divider configured to reduce ASN. The input capacitors may also be embodied as any arbitrary impedance such as inductors or resistors.

The muxes 820a and 820b serve to mix the RF inputs SP and SN with the I/Q local oscillator inputs from the quadrature clock generator 710 (FIG. 7), generating differential outputs MoutA and MoutB. For example, the signal ASP, ASN from the output of the transmit filter 730 (FIG. 7) can be coupled to the muxes 810a and 810b via the high-impedance capacitors 810a and 810b. The clock I/Q multiplies the input signal SP/SN by selecting either the positive or negative side of the voltage.

Figure 9:
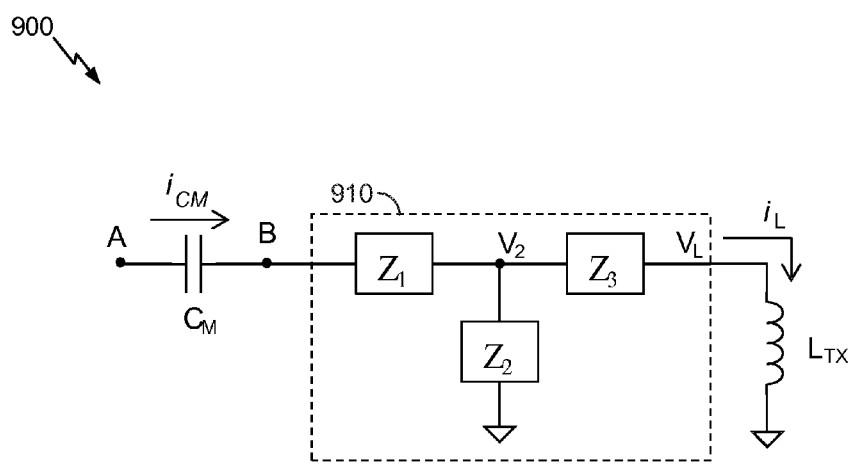
FIG. 9 is a functional block diagram of a portion of transmit circuitry that can be used in the wireless power transfer system of FIG. 1, in accordance with another exemplary embodiment of the invention.

FIG. 9 is a functional block diagram of a portion of transmit circuitry 900 that can be used in the wireless power transfer system of FIG. 1, in accordance with another exemplary embodiment of the invention. The transmit circuitry 900 can include nodes A and B, a measurement capacitor $C_M$, a reactance network 910, and a transmit coil $L_{TX}$. The reactance network 910 can be modeled as simplified to a "Y" network including a node $V_2$, and impedance elements $Z_1$, $Z_2$, and $Z_3$. The reactance network 910 can be a passive network or an actively switched network.

The transmit circuitry 900 can model aspects of the transmit circuitry 700 shown in FIG. 7. For example, the nodes A and B can correspond to the nodes ASP and BSP (FIG. 7), respectively. The measurement capacitor $C_M$ can correspond to the positive measurement capacitor $C_{MP}$ (FIG. 7). The reactance network 910 corresponds to the series capacitor $C_{SP}$ (FIG. 7). As another example, the nodes A and B can correspond to the nodes ASN and BSN (FIG. 7), respectively. The measurement capacitor $C_M$ can correspond to the positive measurement capacitor $C_{MN}$ (FIG. 7). The reactance network 910 corresponds to the series capacitor $C_{SN}$ (FIG. 7).

In an embodiment, the processor 780 (FIG. 7) can calculate the load current ($i_L$) using nodal analysis. The voltage at node B can measured using the mixer circuit 740a and/or 740b (FIG. 7), and $i_{CM}$ is calculated as described herein. The voltage at the center node of the Y network (V2) is the voltage at node B minus the voltage drop of $i_{CM}$ through Z1, as shown in Equation 6.

$$V_2 = V_B - i_{CM} Z_1 \quad (6)$$

The load current is what remains after the shunting impedance Z2 reduces the source current at the center of the Y network, as shown in Equation 7.

$$i_L = i_{CM} - \frac{V_2}{Z_2} \quad (7)$$

Substituting Equation 6 into the numerator of Equation 7 and rearranging terms gives Equation 8.

$$i_L = i_{CM}\left(1 + \frac{Z_1}{Z_2}\right) - \frac{V_B}{Z_2} \quad (8)$$

The Z terms can be configured as fixed constants that multiply $i_{CM}$ and $V_B$. The term that multiplies $i_{CM}$ can be unit-less and can be pre-calculated, as shown in Equation 9.

$$K_{1x} = 1 + \frac{Z_{1x}}{Z_{2x}} \quad (9)$$

The multiplier for the $V_B$ term can be considered an admittance, as shown in Equation 10. X can refer to an admittance value for a particular network configuration.

$$Y_x = \frac{1}{Z_{2x}} \quad (10)$$

Using the coefficients derived above, the processor 780 (FIG. 7) can determine the real and imaginary components of the load current by combining Equation 8 through Equation 10. The real portion is shown in Equation 11. The imaginary portion of the load current is shown in Equation 12.

$$RE\{i_L\} = RE\{i_{CM}\}RE\{K_{1x}\} + IM\{V_{MB}\}IM\{Y_x\} - IM\{i_{CM}\}IM\{K_{1x}\} - RE\{V_{MB}\}RE\{Y_x\} \quad (11)$$

$$IM\{i_L\} = RE\{i_{CM}\}IM\{K_{1x}\} + IM\{i_{CM}\}RE\{K_{1x}\} - RE\{V_{MB}\}IM\{Y_x\} - IM\{V_{MB}\}RE\{Y_x\} \quad (12)$$

The real and imaginary portions can be combined to determine the magnitude of the load current, as shown in Equation 13.

$$MAG\{i_L\} = \sqrt{RE\{i_L\}^2 + IM\{i_L\}^2} \quad (13)$$

The voltage at the load can be calculated by subtracting the voltage drop across $Z_3$ from $V_2$, as shown in Equation 14.

$$V_L = V_2 - i_L Z_2 \quad (14)$$

Combining Equation 14 and Equation 8 yields Equation 15.

$$V_L = V_B\left(1 + \frac{Z_3}{Z_2}\right) - i_{CM}\left(Z_1 + Z_3 + \frac{Z_1 Z_3}{Z_2}\right) \quad (15)$$

The Z terms can be combined into coefficients for multiplication with the measured current and voltage values. Using X to denote the specific configuration of the reactance network 910, the complex voltage coefficient is shown in Equation 16. The current coefficient is shown in Equation 17.

$$K_{2x} = 1 + \frac{Z_{3x}}{Z_{2x}} \quad (16)$$

$$Z_{Yx} = Z_{1x} + Z_{3x} + \frac{Z_{1x} + Z_{3x}}{Z_{2x}} \quad (17)$$

Accordingly, the processor 780 can determine the real portion of the load voltage according to Equation 18. The processor 780 can determine the imaginary portion of the load voltage according to Equation 19.

$$RE\{V_L\}=RE\{V_B\}RE\{K_{2x}\}-IM\{V_B\}IM\{K_{2x}\}-RE\{i_{CM}\}RE\{Z_{Yx}\}+IM\{i_{CM}\}IM\{Z_{Yx}\} \quad (18)$$

$$IM\{V_L\}=RE\{V_B\}IM\{K_{2x}\}+IM\{V_B\}RE\{K_{2x}\}-RE\{i_{CM}\}IM\{Z_{Yx}\}-IM\{i_{CM}\}RE\{Z_{Yx}\} \quad (19)$$

The impedance looking into the resonator can be calculated using Ohm's law and the complex voltage and current already sampled for the power measurement. Accordingly, the processor 780 can determine the impedance of the transmit coil $L_{TX}$ according to Equation 20, the real portion of the load according to Equation 21, and the imaginary portion of the load according to Equation 22.

$$Z_L = \frac{RE\{V_L\} + jIM\{V_L\}}{RE\{i_L\} + jIM\{i_L\}} \quad (20)$$

$$R_L = \frac{RE\{V_L\}RE\{i_L\} + IM\{V_L\}IM\{i_L\}}{RE\{i_L\}^2 + IM\{i_L\}^2} \quad (21)$$

$$X_L = \frac{IM\{V_L\}RE\{i_L\} - RE\{V_L\}IM\{i_L\}}{RE\{i_L\}^2 + IM\{i_L\}^2} \quad (22)$$

Figure 10:
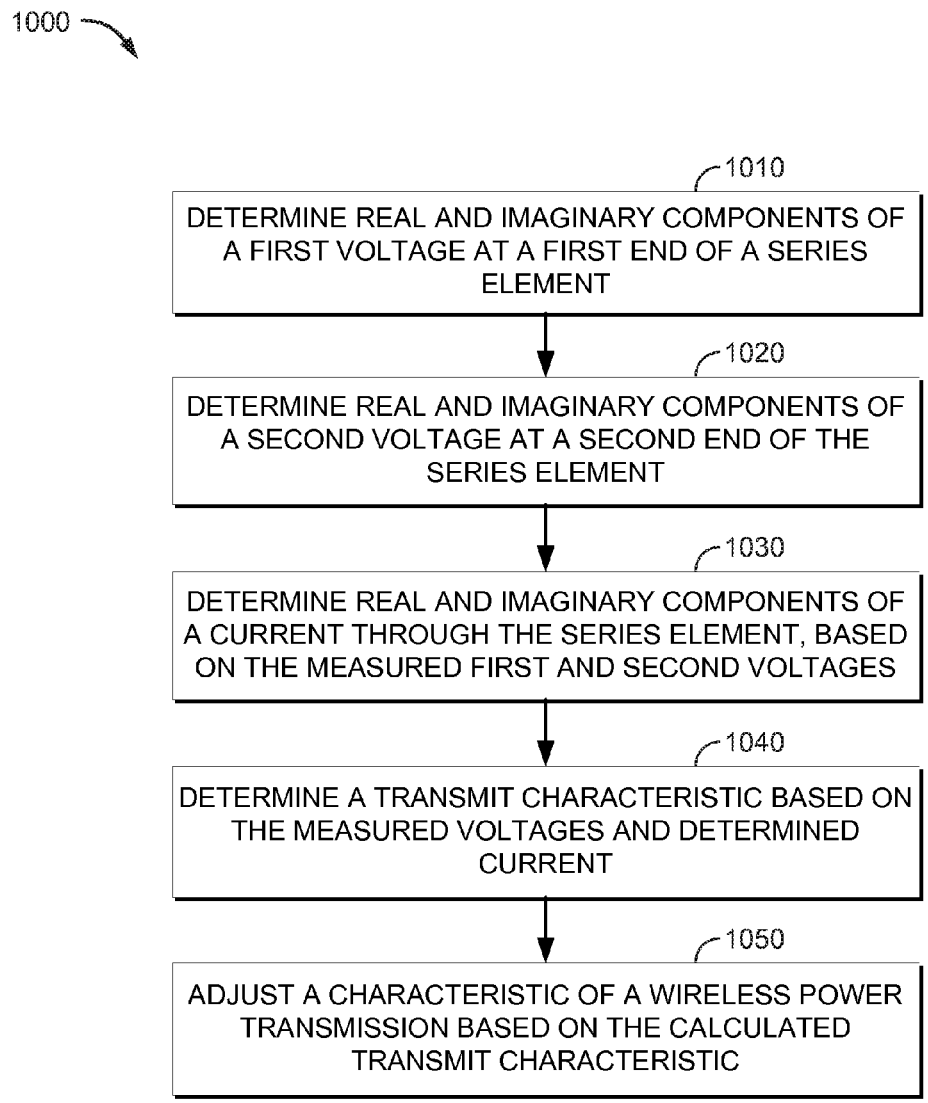
FIG. 10 is a flowchart of an exemplary method of wireless power transmission.

FIG. 10 is a flowchart 1000 of an exemplary method of wireless power transmission. Although the method of flowchart 1000 is described herein with reference to the wireless power transmission system 110 discussed above with respect to FIGS. 1-2, the transmitter 404 discussed above with respect to FIG. 4, and the transmit circuitry 700 discussed above with respect to FIG. 7, a person having ordinary skill in the art will appreciate that the method of flowchart 1000 can be implemented by another device described herein, or any other suitable device. In an embodiment, the steps in flowchart 1000 can be performed by a processor or controller such as, for example, the controller 415 (FIG. 4), the processor-signaling controller 516 (FIG. 5), and/or the processor 780 (FIG. 7). Although the method of flowchart 1000 is described herein with reference to a particular order, in various embodiments, blocks herein can be performed in a different order, or omitted, and additional blocks can be added.

First, at block 1010, the processor 780 determines real and imaginary components of a first voltage at a first terminal of a series element. The series element can be a measurement capacitor electrically coupled to a transmit coil, such as the series elements $C_{MP}$ and $C_{MN}$. For example, the processor 780 can control the quadrature clock generator 710 to successively output I and Q signals to the mixer 740a. Accordingly, the mixer 740a can output the real and imaginary components of the voltage signal at the nodes ASP and ASN. In an embodiment, the series element can include a resistor or inductor such as, for example, a component in the transmit filter 730. In an embodiment, the first voltage can be a differential voltage.

Next, at block 1020, the processor 780 determines real and imaginary components of a second voltage at a second terminal of the series element. For example, the processor 780 can control the quadrature clock generator 710 to successively output I and Q signals to the mixer 740b. Accordingly, the mixer 740b can output the real and imaginary components of the voltage signal at the nodes BSP and BSN. In an embodiment, the second voltage can be a differential voltage.

In various embodiments, the summing amplifiers 750a and 750b can output the sum and/or difference between the real and imaginary components received from the mixers 740a and 740b. The LPFs 760a and 760b can filter the outputs of the summing amplifiers 750a and 750b. The ADCs 770a and 770b can convert the outputs of the LPFs 760a and 760b into digital values provided to the processor 780. The processor 780 can scale the values.

Then, at block 1030, the processor 780 determines real and imaginary components of a current through the series element, based on the measured first and second voltages. For example, the processor 780 can know the values of the series elements $C_{MP}$ and $C_{MN}$, which can be stored in a memory, calibrated, or dynamically determined. The processor 780 can calculate current according to the complex form of Ohm's law.

Thereafter, at block 1040, the processor 780 determines a transmit characteristic based on the measured voltages and determined current. For example, the processor 780 can calculate a transmit power using the power vector Equation 22, where I* is the complex conjugate of the RMS value of the measured current. In an embodiment, the processor 780 can calculate a complex impedance at the operating frequency using the same parameters as Z=V/I, as discussed below with respect to FIG. 11.

$$\vec{P} = \vec{V} \cdot \vec{I}^* \quad (22)$$

In various embodiments, the processor 780 can break down the power vector into real and imaginary components. The processor 780 can calculate RMS values for voltage and current, apply scaling factors, and/or similar processing. Similarly, the processor 780 can use vector data to calculate impedances, currents, and voltages at any point in the circuit based on known component values. Transmitted wireless power and wireless load impedance can therefore be resolved as losses and reactance coupled through the transmit coil $L_{TX}$.

Subsequently, at block 1050, the processor 780 adjusts a characteristic of a wireless power transmission based on the calculated transmit characteristic. For example, the processor 780 can determine that an unintentional receiver is near to the transmit coil $L_{TX}$. The processor 780 can compare the calculated transmit characteristic to receive powers reported by one or more authorized or registered receivers. In various embodiments, the processor 780 can increase, decrease, or otherwise modify transmit characteristic based on the calculated transmit characteristic.

Figure 11:
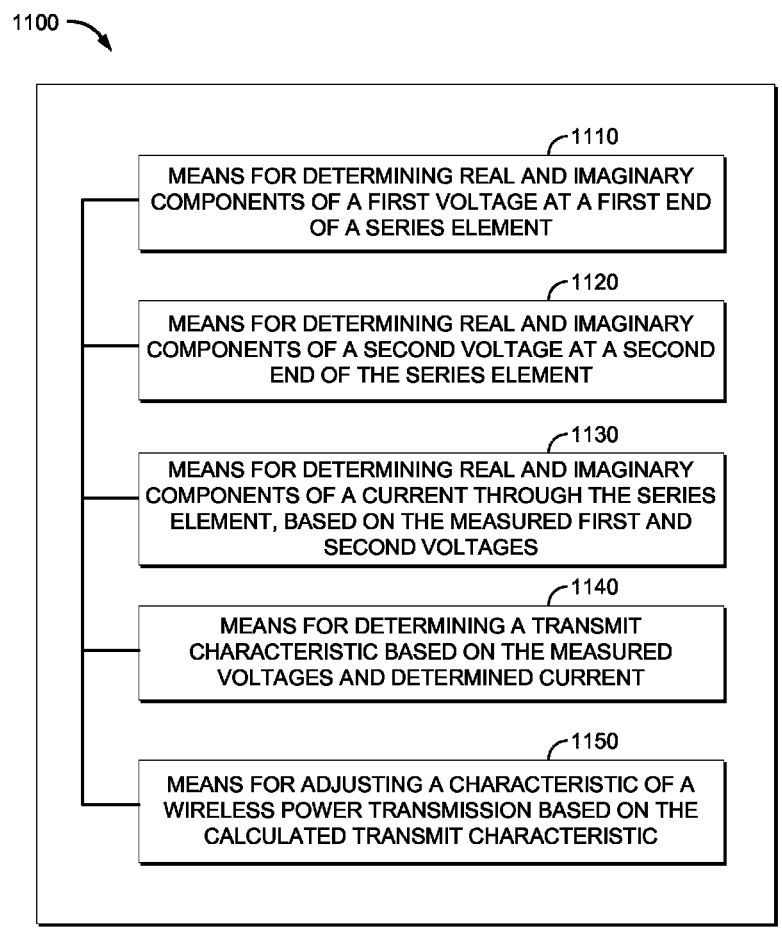
FIG. 11 is a functional block diagram of an apparatus for detecting a transmit characteristic, in accordance with an embodiment of the invention.

FIG. 11 is a functional block diagram of an apparatus for detecting a transmit characteristic 1100, in accordance with an embodiment of the invention. Those skilled in the art will appreciate that an apparatus for wireless communication can have more components than the simplified apparatus 1100 shown in FIG. 11. The apparatus for detecting a transmit characteristic 1100 shown includes only those components useful for describing some prominent features of implementations within the scope of the claims. The apparatus for detecting a transmit characteristic 1100 includes means 1110 for determining real and imaginary components of a first voltage at a first terminal of a series element, means 1120 for determining real and imaginary components of a second voltage at a second terminal of the series element, means 1130 for determining real and imaginary components of a current through the series element, based on the measured first and second voltages, means 1140 for determining a transmit characteristic based on the measured voltages and determined current, and means 1150 for adjusting a characteristic of a wireless power transmission based on the calculated transmit characteristic.

In an embodiment, means 1110 for determining real and imaginary components of a first voltage at a first terminal of a series element can be configured to perform one or more of the functions described above with respect to block 1010

(FIG. 10). In various embodiments, the means 1110 for determining real and imaginary components of a first voltage at a first terminal of a series element can be implemented by one or more of the processor 780 (FIG. 7), the quadrature clock generator 710 (FIG. 7), the capacitors $C_{MP}$, $C_{MN}$, $C_{SP}$, and/or $C_{SN}$ (FIG. 7), the mixers 740a and 740b (FIG. 7), the summing amplifiers 750a and 750b, the LPFs 760a and 760b, and the ADCs 770a and 770b.

In an embodiment, means 1120 for determining real and imaginary components of a second voltage at a second terminal of the series element can be configured to perform one or more of the functions described above with respect to block 1020 (FIG. 10). In various embodiments, the means 1120 for determining real and imaginary components of a second voltage at a second terminal of the series element can be implemented by one or more of the processor 780 (FIG. 7), the quadrature clock generator 710 (FIG. 7), the capacitors $C_{MP}$, $C_{MN}$, $C_{SP}$, and/or $C_{SN}$ (FIG. 7), the mixers 740a and 740b (FIG. 7), the summing amplifiers 750a and 750b, the LPFs 760a and 760b, and the ADCs 770a and 770b.

In an embodiment, means 1130 for determining real and imaginary components of a current through the series element, based on the measured first and second voltages can be configured to perform one or more of the functions described above with respect to block 1030 (FIG. 10). In various embodiments, the means 1130 for determining real and imaginary components of a current through the series element, based on the measured first and second voltages can be implemented by one or more of the processor 780 (FIG. 7), the controller 415 (FIG. 4), and the memory 470 (FIG. 4).

In an embodiment, means 1140 for determining a transmit characteristic based on the measured voltages and determined current can be configured to perform one or more of the functions described above with respect to block 1040 (FIG. 10). In various embodiments, the means 1140 for determining a transmit characteristic based on the measured voltages and determined current can be implemented by one or more of the processor 780 (FIG. 7), the controller 415 (FIG. 4), and the memory 470 (FIG. 4).

In an embodiment, means 1150 for adjusting a characteristic of a wireless power transmission based on the calculated transmit characteristic can be configured to perform one or more of the functions described above with respect to block 1050 (FIG. 10). In various embodiments, the means 1150 for adjusting a characteristic of a wireless power transmission based on the calculated transmit characteristic can be implemented by one or more of the processor 780 (FIG. 7), the controller 415 (FIG. 4), and the memory 470 (FIG. 4).

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

Information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the embodiments of the invention.

The various illustrative blocks, modules, and circuits described in connection with the embodiments disclosed herein can be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein can be embodied directly in hardware, in a software module executed by a processor, or in a combination of the two. If implemented in software, the functions can be stored on or transmitted over as one or more instructions or code on a tangible, non-transitory computer-readable medium. A software module can reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium can be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium can reside in an ASIC. The ASIC can reside in a user terminal. In the alternative, the processor and the storage medium can reside as discrete components in a user terminal.

For purposes of summarizing the disclosure, certain aspects, advantages and novel features of the inventions have been described herein. It is to be understood that not necessarily all such advantages can be achieved in accordance with any particular embodiment of the invention. Thus, the invention can be embodied or carried out in a manner that achieves or optimizes one advantage or group of advantages as taught herein without necessarily achieving other advantages as can be taught or suggested herein.

Various modifications of the above described embodiments will be readily apparent, and the generic principles defined herein can be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of detecting a transmit characteristic in a wireless power transmission device comprising a series element electrically coupled to a transmit coil, comprising:
   determining real and imaginary components of a first voltage at a first terminal of the series element;
   determining real and imaginary components of a second voltage at a second terminal of the series element;
   determining real and imaginary components of a current through the series element, based on the measured first and second voltages;
   determining a transmit characteristic based on the measured voltages and determined current; and
   adjusting a characteristic of a wireless power transmission based on the calculated transmit characteristic.

2. The method of claim 1, further comprising directly measuring the current through the series element.

3. The method of claim 1, wherein the first and second voltages comprise differential voltages.

4. The method of claim 1, wherein the transmit characteristic comprises one of a transmit power or a complex impedance.

5. The method of claim 1, wherein the series element comprises one of a capacitor, an inductor, or a resistor.

6. The method of claim 1, further comprising applying a scaling factor to at least one measured voltage.

7. The method of claim 1, further comprising determining a root-mean-square (RMS) voltage and/or current based on at least one measured voltage.

8. The method of claim 1, further comprising multiplying at least one voltage by an in-phase or quadrature clock signal.

9. The method of claim 8, further comprising summing a resulting product of said multiplying.

10. The method of claim 1, further comprising dividing at least one voltage or current.

11. A wireless device configured to provide wireless power to a receiver comprising:
    a transmit coil configured to transmit wireless power;
    a quadrature clock generator configured to generate in-phase (I) and quadrature (Q) clock signals;
    a series element, electrically coupled to the transmit coil, comprising first and second terminals or ports;
    a mixer or set of mixers configured to multiply at least one signal at the first and second terminals or ports of the series element by one of the I and Q signals.

12. The device of claim 11, wherein the signals at the first and second terminals of the series element comprise differential signals.

13. The device of claim 11, wherein the mixer comprises a single-ended or differential mixer.

14. The device of claim 11, wherein the at least one signal comprises a wireless power signal.

15. The device of claim 11, wherein the series element comprises one of a capacitor, an inductor, or a resistor.

16. The device of claim 11, further comprising a processor configured to calculate a transmit characteristic based on the multiplied signals.

17. The device of claim 16, wherein the processor is further configured to adjust a characteristic of a wireless power transmission based on the calculated transmit characteristic.

18. The device of claim 16, wherein the calculated transmit characteristic comprises one of a transmit power or a complex impedance.

19. The device of claim 16, wherein the processor is further configured to calculate a current through the series element.

20. The device of claim 16, wherein the processor is further configured to determine a root-mean-square (RMS) voltage and/or current based on at least one measured voltage.

21. The device of claim 11, further comprising a summing amplifier configured to sum an output of the first and second mixers.

22. The device of claim 11, comprising a voltage divider configured to reduce a voltage at the mixer.

23. An apparatus for detecting a transmit characteristic in a wireless power transmission device comprising a series element electrically coupled to a transmit coil, comprising:
    means for determining real and imaginary components of a first voltage at a first terminal of the series element;
    means for determining real and imaginary components of a second voltage at a second terminal of the series element;
    means for determining real and imaginary components of a current through the series element, based on the measured first and second voltages;
    means for determining a transmit characteristic based on the measured voltages and determined current; and
    means for adjusting a characteristic of a wireless power transmission based on the calculated transmit characteristic.

24. The apparatus of claim 23, further comprising means for directly measuring the current through the series element.

25. The apparatus of claim 23, wherein the first and second voltages comprise single-ended or differential voltages.

26. The apparatus of claim 23, wherein the transmit characteristic comprises one of a transmit power or a complex impedance.

27. The apparatus of claim 23, wherein the series element comprises one of a capacitor, an inductor, or a resistor.

28. The apparatus of claim 23, further comprising means for applying a scaling factor to at least one measured voltage.

29. The apparatus of claim 23, further comprising means for determining a root-mean-square (RMS) voltage and/or current based on at least one measured voltage.

30. The apparatus of claim 23, further comprising means for multiplying at least one voltage by an in-phase or quadrature clock signal.

31. The apparatus of claim 30, further comprising means for summing a resulting product of said multiplying.

32. The apparatus of claim 23, further comprising means for voltage dividing at least one voltage.

33. A non-transitory computer-readable medium comprising code that, when executed, causes an apparatus to:
    determine real and imaginary components of a first voltage at a first terminal of a series element electrically coupled to a transmit coil;
    determine real and imaginary components of a second voltage at a second terminal of the series element;
    determine real and imaginary components of a current through the series element, based on the measured first and second voltages;
    determine a transmit characteristic based on the measured voltages and determined current; and
    adjust a characteristic of a wireless power transmission based on the calculated transmit characteristic.

34. The medium of claim 33, further comprising code that, when executed, causes the apparatus to directly measure the current through the series element.

35. The medium of claim 33, wherein the first and second voltages comprise single-ended or differential voltages.

36. The medium of claim 33, wherein the transmit characteristic comprises one of a transmit power or a complex impedance.

37. The medium of claim 33, wherein the series element comprises one of a capacitor, an inductor, or a resistor.

38. The medium of claim 33, further comprising code that, when executed, causes the apparatus to apply a scaling factor to at least one measured voltage.

39. The medium of claim 33, further comprising code that, when executed, causes the apparatus to determine a root-mean-square (RMS) voltage and/or current based on at least one measured voltage.

40. The medium of claim 33, further comprising code that, when executed, causes the apparatus to multiply at least one voltage by an in-phase or quadrature clock signal.

41. The medium of claim 40, further comprising code that, when executed, causes the apparatus to sum a resulting product of said multiplying.

42. The medium of claim 33, further comprising code that, when executed, causes the apparatus to reduce at least one voltage.

\* \* \* \* \*